UNITED STATES PATENT OFFICE.

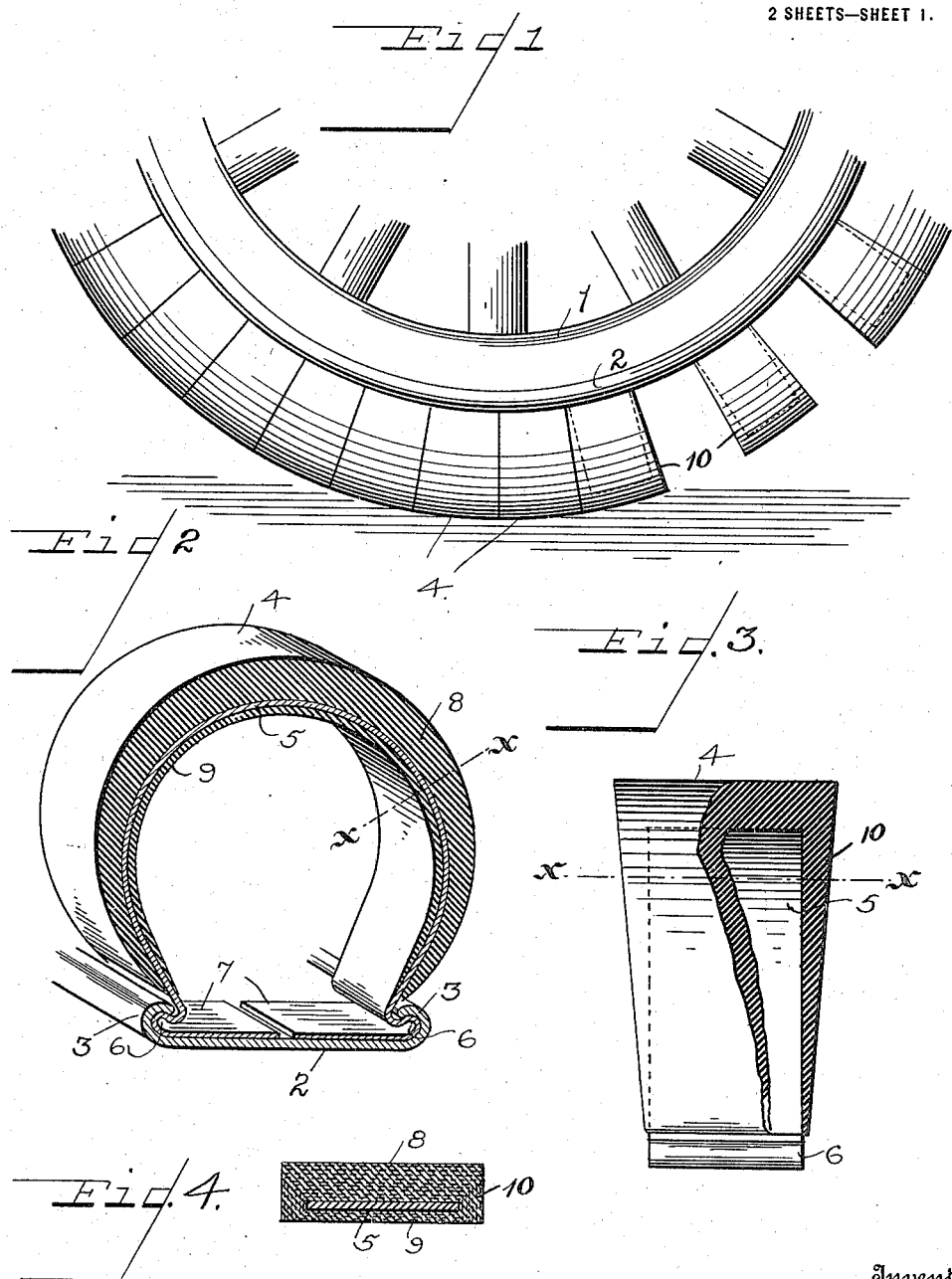

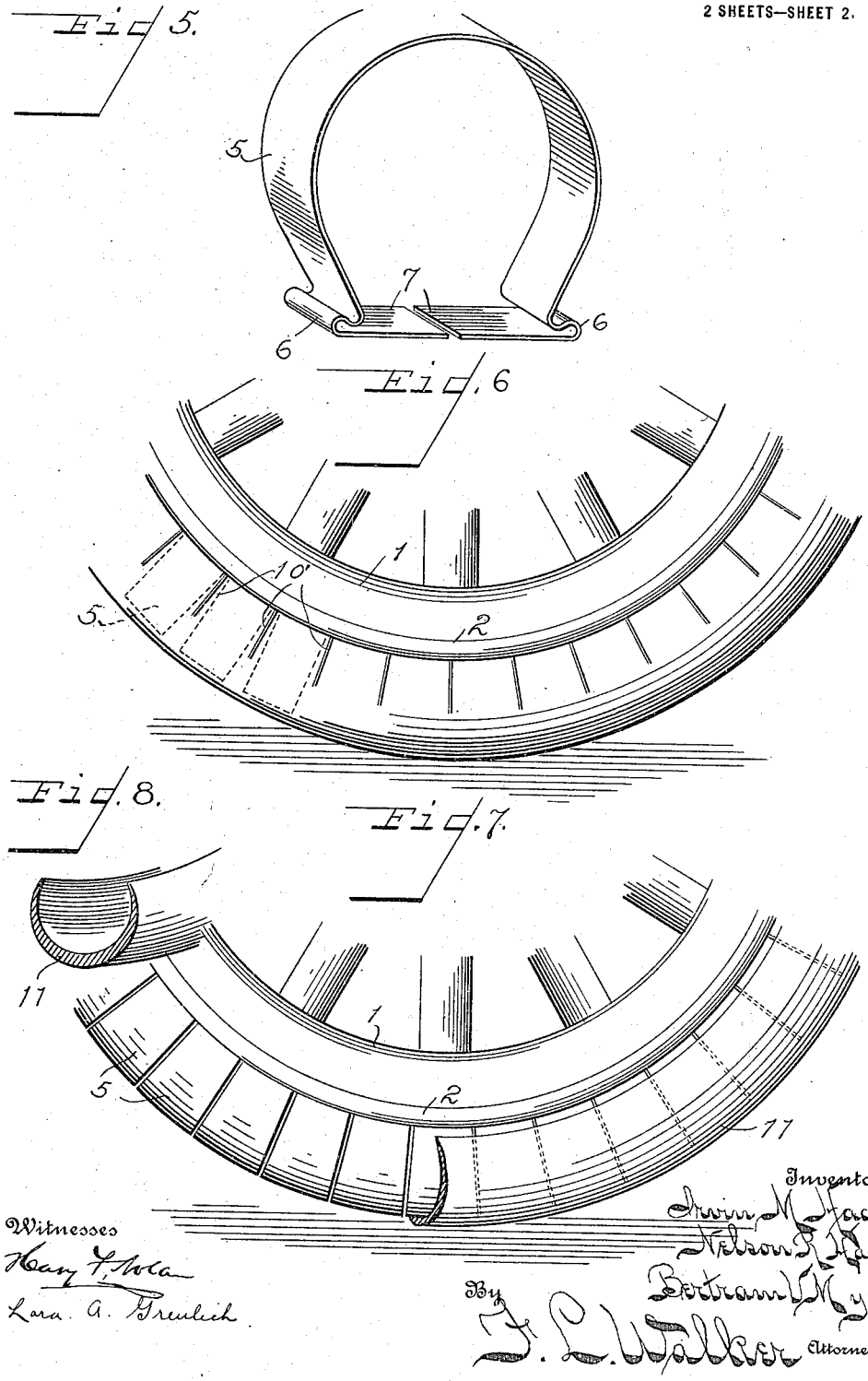

IRVIN M. HAAS, NELSON R. HAAS, AND BERTRAM V. MYERS, OF DAYTON, OHIO, ASSIGNORS OF ONE-FOURTH TO GUS HAAS, OF DAYTON, OHIO.

VEHICLE-TIRE.

1,224,920.  Specification of Letters Patent.  Patented May 8, 1917.

Application filed January 12, 1914. Serial No. 811,613.

*To all whom it may concern:*

Be it known that we, IRVIN M. HAAS, NELSON R. HAAS, and BERTRAM V. MYERS, all citizens of the United States, residing at Dayton, in the county of Montgomery and State of Ohio, have invented certain new and useful Improvements in Vehicle-Tires, of which the following is a specification.

Our invention relates to resilient vehicle tires of the spring type and more particularly to a detachable sectional tire applicable to the wheel rims now in common use.

The object of the invention is to simplify the structure as well as the means and mode of operation of such devices, whereby they will not only be cheapened in construction but will be more efficient in use, capable of being easily and quickly applied or detached and unlikely to get out of repair.

A further object of the invention is to provide a non-pneumatic tire, the several sections of which are inter-changeable and which when damaged or broken may be replaced by similar sections without disturbing the remainder of the tire.

With the above primary and other incidental objects in view as will more fully appear in the specification, the invention consists of the features of construction the parts and combinations thereof, or their equivalents as hereinafter described and set forth in the claims.

Referring to the drawings, Figure 1 is a side elevation of a portion of the vehicle wheel to which the invention has been applied. Fig. 2 is a transverse sectional view of one of the tire units illustrating its connection and relation with the wheel rim. Fig. 3 is a side elevation of one of the tire units with the cover material partly torn away to disclose the resilient spring member within. Fig. 4 is a transverse sectional view on line $x$—$x$ of Figs. 2 and 3. Fig. 5 is a detail perspective view of one of the resilient members without the covering material. Figs. 6 and 7 are side elevations of portions of vehicle wheels to which modifications of the invention shown in the preceding figures have been applied. Fig. 8 is a detail sectional view of the shoe or casing employed in the construction shown in Fig. 7.

Like parts are indicated by similar characters of reference throughout the several views.

The vehicle tire forming the subject matter hereof is adapted to be applied to wheel rims of ordinary construction such as are now commonly employed with pneumatic or other tires of the clencher type. In the drawing 1 is the felly of the wheel carrying the rim 2 which is provided with inturned or recessed marginal flanges 3. The tire forming the subject matter hereof comprises a plurality of separable sections 4, each the counterpart of every other section and interchangeable therewith, engaged with the wheel rim in position closely adjacent one to the other and radial in relation with the wheel. Each tire unit is under sufficient tension when in place upon the wheel to maintain its engagement with the inturned flanges of the rim. The tire units 4 each comprise a flat metallic spring member 5 shaped into a bowed or arcuate form and having at each end of the arc a hook shaped reversed bend 6 adapted to be engaged with the inturned flanges 3 of the rim, and terminating in flat extensions 7 projecting inward toward each other in a common plane. These extensions 7 rest upon the bottom of the channel.

The spring members 5 are preferably though not necessarily provided with a cover 8 of rubber, fabric or other material. This covering is preferably applied by passing the material entirely around the spring member 5 as shown in Fig. 4 and vulcanizing it in position. By this means the spring 5 is entirely inclosed within the covering material which forms a comparatively thin cover 9 upon the interior of the spring member while the cover 8 upon the outer side thereof is of greater thickness. The outer covering is of greatest thickness upon the tread portion of the unit and tapers therefrom to a thin layer adjacent to the hook shaped reversed bends 6. This covering material projects beyond the edges of the spring member 5 to form marginal portions 10 adapted to abut similar marginal portions of the next succeeding unit.

The entire unit is somewhat wedge or sector shaped as shown in Figs. 1 and 3, whereby each unit will abut the succeeding unit from the tread to the rim. The spring member 5 may be of any desired width, but is preferably sufficiently wide to give it a firm bearing in the rim to prevent any rocking or tipping movement in relation with the wheel. The tread portion of the unit may be provided with the usual ribs, beads, studs or buttons, to provide an anti-skid surface, such as is usually found upon vehicle tires.

The sections or units are secured side by side in the channel or rim of the wheel by compressing the unit laterally until the hook shaped reversed bends 6 may be passed within the inturned flanges of the rim where they will be held by the expansion of the unit.

During the engaging operation the free ends of the extensions 7 will overlie one upon the other. As the unit expands into position with the reversed bends 6 engaged beneath the inturned flanges 3, the extensions 7 will assume positions in a common plane as shown in Fig. 2, where they will lock the unit against accidental disengagement. Any tendency of the unit to be disengaged from the inturned flanges 3 by the engagement of the unit with a curb, car track, stone or other obstruction will be resisted by the abutment of the extremity of one extension 7 upon that of the other extension. However when it is desired to remove one of the units it may be done by bending the unit laterally sufficient to tilt one extension 7 above the other at the same time that the unit is being compressed. This will permit one of the hook shaped reverse bends 6 to be disengaged from the rim thereby freeing the unit.

The spring members 5 are proportioned to the weight of the vehicle and load to be carried. Each wedge or sector shaped unit is secured in the rim independent of every other unit and in case of injury or breakage may be readily removed and a new unit replaced without disturbing any other units of the series. While in Figs. 1, 2 and 6, the spring members have been shown with parallel edges it is obvious that if so desired it may be made slightly wider at the tread portion than adjacent to the reversed bend 6, as in Fig. 7.

If so desired, the uncovered spring members 5, such as shown in Fig. 5 may be employed. In such event they would abut one upon the other throughout their entire extent from the tread to the rim. This would provide a resilient all metallic tire. Any section of this metallic tire could be removed or replaced without disturbing the other sections thereof in the manner before described.

For certain uses it may be desirable to vulcanize the separate covered units as previously described into an integral body as is shown in Fig. 6. In such construction the spring members 5 will be spaced within the body one from the other, but will be connected by continuous covering of rubber, fabric, or other material. In constructing such integral tire, it will be found desirable to provide indicating marks 10' either by means of a slight groove, a slight rib or bead or a thread or colored stratum in the covering material at points intermediate the spring members 5. In the event that any one of the spring members is broken or damaged, the tire can then be cut at the adjacent points marked by said indicating lines and the broken section removed to be replaced by a new section, such as is shown in Fig. 3 and is previously described. This new section may be vulcanized to the adjacent ends of the continuous member if desired or may be entirely independent.

In Fig. 7 there is shown a further modification in which the spring metallic members 5 engaged with the rim of the wheel are inclosed in a separable shoe or casing 11. The spring members 5 are placed within the shoe or casing 11 before being engaged with the rim of the wheel. The free edges of the casing being of less diameter than the tread of the tire formed by the separate spring members 5, the casing can not escape but will be retained in position inclosing such spring members.

The spring members 5 comprise transverse load sustaining ribs or bands sufficiently resilient within themself to retain their engagement with the rim and possessing sufficient strength to resiliently support the vehicle and load. As herein shown a tire may comprise a plurality of independent units, either bare or covered or may comprise a plurality of such separate transverse bands or ribs inclosed in an integral covering or casing.

From the above description it will be apparent that there is thus provided a device of the character described, possessing the features of advantage before enumerated as desirable but which obviously is susceptible of modification in its form, proportion, detail construction or arrangement of parts, without departing from the principle involved or sacrificing any of its advantages.

While in order to comply with the statute, the invention has been described in language more or less specific as to certain structural features. it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described our invention, we claim:

1. The combination with a rim of a tire including a plurality of independent metallic arcuate springs each having at the extremities of its arch a reversed or S shaped bend adapted to be engaged with the sides of the rim, and inturned foot portions adapted to abut each other in a common plane.

2. The combination with a wheel rim of a plurality of independent metallic arcuate springs each having at its extremities reversed bends adapted to be engaged under tension with the sides of the rim with which they are held in engagement by the lateral expansive tendency of the arcuate springs, and a body of rubber or similar material in which the crown or medial portion of each arcuate spring is embedded, the reversed ends of the springs being extended beyond the said body for direct engagement with the rim.

In testimony whereof, we have hereunto set our hands this third day of January 1914.

IRVIN M. HAAS.
NELSON R. HAAS.
BERTRAM V. MYERS.

Witnesses:
ALFRED McCRAY,
F. L. WALKER.

Copies of this patent may be obtained for five cents each, by addressing the "Commissioner of Patents, Washington, D. C."